US011893935B2

(12) United States Patent
Zhang et al.

(10) Patent No.: US 11,893,935 B2
(45) Date of Patent: Feb. 6, 2024

(54) DISPLAY SUBSTRATE AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Kai Zhang, Beijing (CN); Qiang Fu, Beijing (CN); Songyuan Ma, Beijing (CN); Dan Cao, Beijing (CN); Yiran Li, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 81 days.

(21) Appl. No.: 17/628,554

(22) PCT Filed: Mar. 11, 2021

(86) PCT No.: PCT/CN2021/080253
§ 371 (c)(1),
(2) Date: Jan. 19, 2022

(87) PCT Pub. No.: WO2021/213062
PCT Pub. Date: Oct. 28, 2021

(65) Prior Publication Data

US 2022/0262309 A1 Aug. 18, 2022

(30) Foreign Application Priority Data

Apr. 24, 2020 (CN) ........................ 202010330865.X

(51) Int. Cl.
*G09G 3/3233* (2016.01)

(52) U.S. Cl.
CPC ... *G09G 3/3233* (2013.01); *G09G 2300/0408* (2013.01); *G09G 2300/0426* (2013.01); *G09G 2300/0809* (2013.01); *G09G 2310/08* (2013.01)

(58) Field of Classification Search
None
See application file for complete search history.

(56) References Cited

U.S. PATENT DOCUMENTS

2005/0237273 A1 10/2005 Ozawa et al.
2009/0322730 A1 12/2009 Yamamoto et al.

(Continued)

FOREIGN PATENT DOCUMENTS

CN 101630479 A 1/2010
CN 102314829 A 1/2012

(Continued)

OTHER PUBLICATIONS

International Search Report for PCT/CN2021/080253 dated Jun. 10, 2021.

(Continued)

*Primary Examiner* — Ifedayo B Iluyomade
(74) *Attorney, Agent, or Firm* — Ling Wu; Stephen Yang; Ling and Yang Intellectual Property

(57) ABSTRACT

A display substrate comprises: an AA and an AA'. The display substrate comprises: a base, and a VSS located in the AA', a Gate, an Init1 and a plurality of display units located in the AA, disposed on the base. The display unite comprises: a driving structure layer and a light-emitting structure layer. The light-emitting structure layer comprises: a light-emitting element. The driving structure layer comprises a pixel driving circuit configured to drive the light-emitting element to emit light. The pixel driving circuit comprises: a reset sub-circuit. The reset sub-circuit is separately con- (Continued)

nected to the Gate, the Init1, and a first pole of the light-emitting element, and is configured to provide a signal of the Init1 to the first pole of the light-emitting element for initializing the first pole. A second pole of the light-emitting element is connected to the VSS. The Inti1 is electrically connected to the VSS.

16 Claims, 7 Drawing Sheets

(56) References Cited

U.S. PATENT DOCUMENTS

| | | | | |
|---|---|---|---|---|
| 2010/0013816 | A1 | 1/2010 | Kwak | |
| 2012/0001893 | A1 | 1/2012 | Jeong et al. | |
| 2016/0203794 | A1 | 7/2016 | Lim et al. | |
| 2018/0075804 | A1* | 3/2018 | Kim | G09G 3/3233 |
| 2018/0174525 | A1* | 6/2018 | Kim | G09G 3/3266 |
| 2018/0357962 | A1 | 12/2018 | Feng | |
| 2019/0096327 | A1 | 3/2019 | Peng et al. | |
| 2020/0044009 | A1 | 2/2020 | Kwak et al. | |
| 2020/0058723 | A1 | 2/2020 | Lee et al. | |

FOREIGN PATENT DOCUMENTS

| | | | |
|---|---|---|---|
| CN | 106067291 | A | 11/2016 |
| CN | 206619376 | U | 11/2017 |
| CN | 107610652 | A | 1/2018 |
| CN | 107808637 | A | 3/2018 |
| CN | 108206009 | A | 6/2018 |
| CN | 109036291 | A | 12/2018 |
| CN | 109215582 | A | 1/2019 |
| CN | 110808265 | A | 2/2020 |
| CN | 110890398 | A | 3/2020 |
| CN | 111489698 | A | 8/2020 |
| KR | 1020100009219 | A | 1/2010 |

OTHER PUBLICATIONS

Decision of Rejection dated Jan. 6, 2022 for Chinese Patent Application No. 202010330865.X and English Translation.

The First Office Action dated Dec. 21, 2020 for Chinese Patent Application No. 202010330865.X and English Translation.

The Second Office Action dated Jul. 20, 2021 for Chinese Patent Application No. 202010330865.X and English Translation.

* cited by examiner

DISPLAY SUBSTRATE AND DISPLAY DEVICE

CROSS-REFERENCE TO RELATED APPLICATIONS

The present application is a U.S. National Phase Entry of International Application No. PCT/CN2021/080253 having an international filing date of Mar. 11, 2021, which claims the priority of Chinese Patent Application No. 202010330865.X, filed to the CNIPA on Apr. 24, 2020 and entitled "Display Substrate and Display Device," The above-identified applications are incorporated into the present disclosure by reference in their entireties.

TECHNICAL FIELD

The present disclosure relates to, but is not limited to, the field of display, in particular to a display substrate and a display device.

BACKGROUND

Organic Light-Emitting Diode (OLED) is one of hotspots in the research field of flat panel display currently. Compared with Liquid Crystal Displays (LCDs), OLED displays have advantages such as low energy consumption, low production cost, self-luminescence, wide viewing angle, and fast response speed. At present, in the display fields of mobile phones, tablet computers, digital cameras, etc., OLED displays have begun to replace traditional LCD displays.

OLED adopts current driving, which needs a stable current to control the OLED to emit light. Generally, an OLED display outputs a current to the OLED through a pixel drive circuit to drive the OLED to emit light.

SUMMARY

The following is a summary of subjects described in the present disclosure in detail. The summary is not intended to limit the scope of protection of the claims.

In a first aspect, the present disclosure provides a display substrate, including: a display region and a non-display region, wherein the display substrate includes: a substrate, and a first power supply line, a scanning signal line, a first initial signal line and multiple display units disposed on a substrate; the display units are located in the display region, and the first power supply line is located in the non-display region;

a display unit includes a drive structure layer and a light-emitting structure layer; the light-emitting structure layer includes: a light-emitting element, and the drive structure layer includes: a pixel drive circuit configured to drive the light-emitting element to emit light; the pixel drive circuit includes: a reset sub-circuit, connected with the scanning signal line, the first initial signal line and a first electrode of the light-emitting element respectively, and configured to provide a signal of the first initial signal line to the first electrode of the light-emitting element under the control of a signal of the scanning signal line to initialize the first electrode of the light-emitting element; and a second electrode of the light-emitting element is connected with the first power supply line; and the first initial signal line is electrically connected with the first power supply line.

In some possible implementations, the first initial signal line includes: a first initial signal part and a second initial signal part connected with each other;

the first initial signal part extends along a first direction and is connected with the reset sub-circuit in the pixel drive circuit; the second initial signal part extends along a second direction and is connected with the first power supply line; and the first direction is an extension direction of the scanning signal line, and the second direction is perpendicular to the first direction.

In some possible implementations, the second initial signal part is located in the non-display region and is disposed at a side of the first power supply line close to the display region.

In some possible implementations, the first power supply line includes a first power supply signal part, a second power supply signal part and a third power supply signal part;

the first power supply signal part and the third power supply signal part extend along the second direction, and the second power supply signal part extends along the first direction; the first power supply signal part is connected with one end of the second power supply signal part, and the third power supply signal part is connected with the other end of the second power supply signal part; and the second initial signal part is connected with a middle part of the second power supply signal part.

In some possible implementations, the display substrate further includes: a gate driver located in the non-display region;

the gate driver is disposed between the second initial signal part and the first power supply line.

In some possible implementations, the display substrate further includes: a timing controller and a clock signal line located in the non-display region;

the clock signal line is connected with the timing controller and the gate driver respectively, and is configured to provide a clock signal to the gate driver under the control of the timing controller; and an orthogonal projection of the second initial signal part on the substrate and an orthogonal projection of the clock signal line on the substrate have an overlapping region.

In some possible implementations, the clock signal line includes a first clock signal part, a second clock signal part and a third clock signal part;

the first clock signal part and the third clock signal part extend along the second direction; the second clock signal part extends along the first direction;

a first end of the first clock signal part is connected with the gate driver, and a second end of the first clock signal part is connected with a first end of the second clock signal part; a second end of the second clock signal part is connected with a first end of the third clock signal part; a second end of the third clock signal part is connected with the timing controller; and an orthogonal projection of the second initial signal part on the substrate and an orthogonal projection of the second clock signal part on the substrate have an overlapping region.

In some possible implementations, the scanning signal line includes: a first scanning signal line and a second scanning signal line disposed in parallel; the display substrate also includes: a second power supply line, a light-emitting signal line, a data signal line and a second initial signal line; and the light-emitting signal line extends along the first direction, and the second power supply line and the data signal line extend along the second direction.

In some possible implementations, the pixel drive circuit further includes a drive control sub-circuit, a drive sub-circuit and a light-emitting control sub-circuit;

the drive control sub-circuit is connected with the first scanning signal line, the second scanning signal line, the data signal line, the second power supply line, the second initial signal line, a first node, a second node and a third node respectively, and is configured to provide a signal of the data signal line and a signal of the second node to the first node and the third node respectively under the control of a signal of the first scanning signal line, and to provide a signal of the second initial signal line to the second node under the control of a signal of the second scanning signal line;

the drive sub-circuit is connected with the first node, the second node, and the third node respectively, and is configured to provide a drive current to the third node under the control of signals of the first node and the second node;

the light-emitting control sub-circuit is connected with the first node, the third node, the light-emitting signal line, the second power supply line and the first electrode of the light-emitting element respectively, and is configured to provide the signal of the second power supply line to the first node and a signal of the third node to the first electrode of the light-emitting element under the control of a signal of the light-emitting signal line; and the reset sub-circuit is connected with the first scanning signal line or the second scanning signal line.

In some possible implementations, the reset sub-circuit includes: a first transistor; the drive control sub-circuit includes: a storage capacitor, second to fourth transistors; the drive sub-circuit includes: a drive transistor; and the light-emitting control sub-circuit includes a fifth transistor and a sixth transistor;

a control electrode of the first transistor is connected with the first scanning signal line or the second scanning signal line, a first electrode of the first transistor is connected with the first initial signal line, and a second electrode of the first transistor is connected with the first electrode of the light-emitting element;

a control electrode of the second transistor is connected with the first scanning signal line, a first electrode of the second transistor is connected with the data signal line, and a second electrode of the second transistor is connected with the first node;

a control electrode of the third transistor is connected with the second scanning signal line, a first electrode of the third transistor is connected with the second initial signal line, and a second electrode of the third transistor is connected with the second node;

a control electrode of the fourth transistor is connected with the first scanning signal line, a first electrode of the fourth transistor is connected with the second node, and a second electrode of the fourth transistor is connected with the third node;

a control electrode of the fifth transistor is connected with the light-emitting signal line, a first electrode of the fifth transistor is connected with the second power supply line, and a second electrode of the fifth transistor is connected with the first node;

a control electrode of the sixth transistor is connected with the light-emitting signal line, a first electrode of the sixth transistor is connected with the third node, and a second electrode of the sixth transistor is connected with the first electrode of the light-emitting element; and a first end of the storage capacitor is connected with the second power supply line, and a second end of the storage capacitor is connected with the second node.

In some possible implementations, the number of the first power supply lines located in the non-display region is two; two first power supply lines are respectively located at two sides of the display region;

the number of the first initial signal lines connected with the reset sub-circuit in each pixel drive circuit is two; one of the first initial signal lines is located at a side of a first one of the first power supply lines close to the display region and is connected with the first one of the first power supply lines, and the other one of the first initial signal lines is located at a side of a second one of the first power supply lines close to the display region and is connected with the second one of the first power supply lines.

In some possible implementations, the drive structure layer includes: a first insulating layer, a semiconductor layer, a second insulating layer, a first metal layer, a third insulating layer, a second metal layer, a fourth insulating layer, and a third metal layer which are sequentially stacked on the substrate; and the semiconductor layer includes: an active layer of all transistors in the pixel drive circuit; the first metal layer includes the first scanning signal line, the second scanning signal line, the light-emitting signal line and control electrodes of all transistors in the pixel drive circuit; the second metal layer includes: the first initial signal line and the second initial signal line; the third metal layer includes the first power supply line, the second power supply line, the data signal line and the first and second electrodes of all transistors in the pixel drive circuit.

In some possible implementations, the fourth insulating layer is disposed with a via hole exposing the first initial signal line; the via hole is located in the non-display region and is disposed at a side of the gate driver close to the display region; and the first power supply line is connected with the first initial signal line through the via hole.

In some possible implementations, the via hole exposes the second initial signal part of the first initial signal line; and the first power supply line is connected with the second initial signal part of the first initial signal line through the via hole.

In a second aspect, the present disclosure further provides a display device, including: the display substrate as described above.

After reading and understanding the drawings and the detailed description, other aspects may be understood.

BRIEF DESCRIPTION OF DRAWINGS

The drawings are used to provide an understanding of technical solutions of the present disclosure, form a part of the specification, and are used to explain, together with the embodiments of the present disclosure, the technical solutions of the present disclosure but are not intended to form limitations on the technical solutions of the present disclosure.

DETAILED DESCRIPTION

Figure 1:
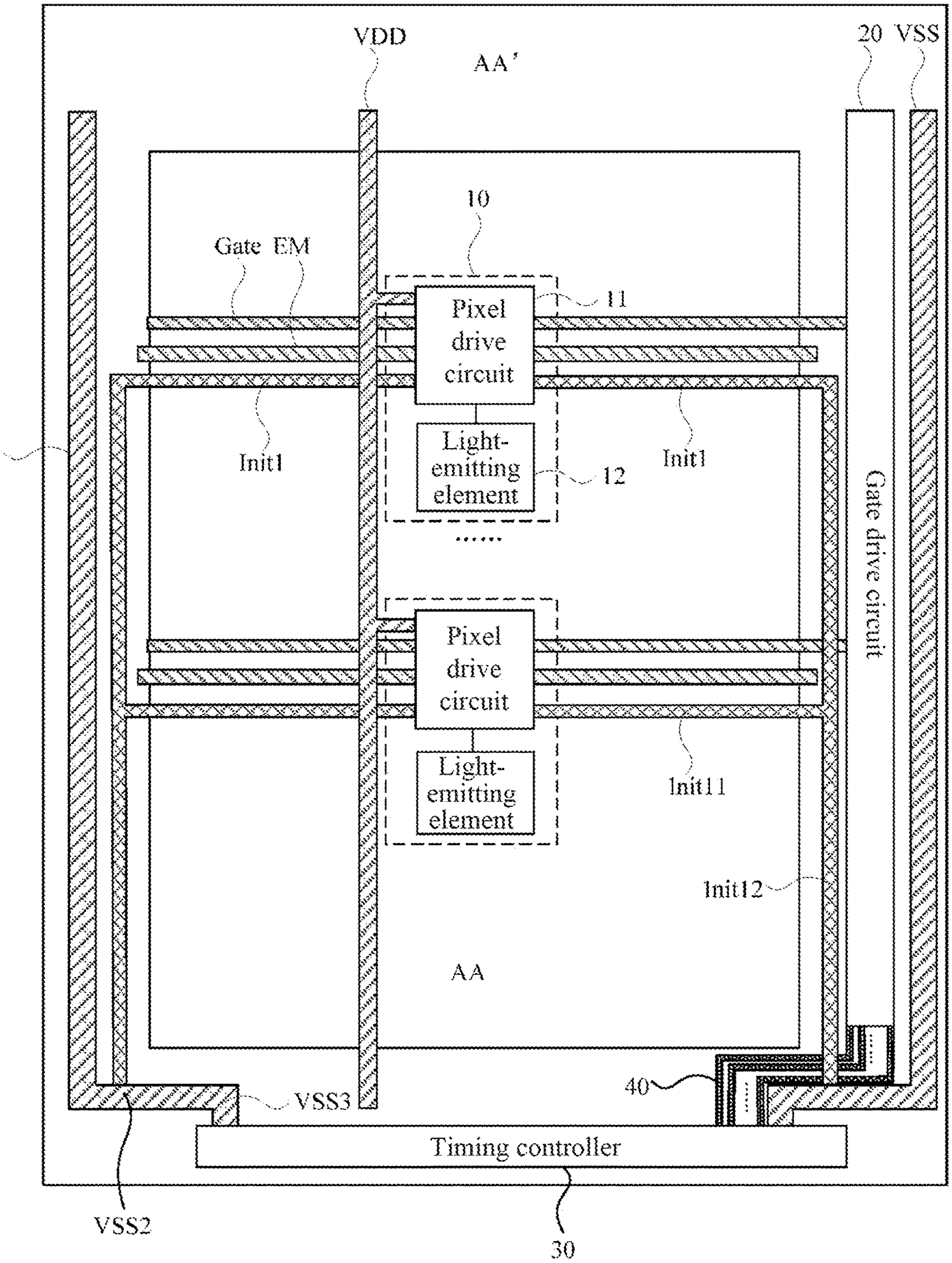
FIG. 1 is a schematic diagram of a structure of a display substrate according to an embodiment of the present disclosure.

The embodiments of the present disclosure will be described below in combination with the drawings in detail. The embodiments in the present disclosure and the features in the embodiments can be freely combined without conflicts.

The present disclosure describes several embodiments, but the description is exemplary rather than restrictive, and those of ordinary skill in the art will recognize that more embodiments and implementation schemes are possible within the scope of the embodiments described in the present disclosure. Although a number of possible combinations of features are shown in the drawings and discussed in the embodiments, many other combinations of the disclosed features are also possible. Unless specifically restricted, any feature or element of any embodiment may be combined with any other feature or element in any other embodiment for use, or may take the place of any other feature or element in any other embodiment.

The present disclosure includes and conceives combinations of features and elements well known to those of ordinary skill in the art. The disclosed embodiments, features and elements of the present disclosure may be combined with any regular features or elements to form a technical solution defined by the claims. Any feature or element of any embodiment may also be combined with features or elements from another technical solution to form another technical solution defined by the claims. Therefore, it should be understood that any of the illustrated features discussed in the present disclosure may be implemented individually or in any suitable combination. Therefore, no other limits are made to the embodiments, except limits made by the appended claims and equivalent replacements thereof. In addition, various modifications and variations may be made within the scope of protection of the appended claims.

Unless otherwise defined, technical terms or scientific terms used in the present disclosure should have the common meaning understood by those skilled in the art of the present disclosure. "First", "second", and similar terms used in the present disclosure do not represent any sequence, number, or significance but are only adopted to distinguish different components. The word "comprise" or "include", etc. means that an element or article that precedes the word is inclusive of the element or article listed after the word and equivalents thereof, but does not exclude other elements or articles. Wordings such as "connect" or "connected" are not limited to physical or mechanical connection, but may include electrical connection, whether direct or indirect. "Above", "below", "left", "right", and the like are only used to indicate relative position relationships. When the absolute position of the described object changes, the relative position relationship may also change accordingly.

Transistors used in all embodiments of the present disclosure may be thin film transistors or field effect transistor or other devices with same characteristics. A thin film transistor may be an oxide semiconductor transistor. A source and a drain of the transistor used here are symmetric, so the drain and the source thereof may be interchanged. In the embodiments of the present disclosure, for distinguishing the two electrodes, except a gate, of the transistor, one electrode is referred to as a first electrode, the other electrode is referred to as a second electrode, the first electrode may be the source or the drain, and the second electrode may be the drain or the source.

In an OLED display, a cathode of an OLED is connected with a low-level power supply line, and a pixel drive circuit is connected with an initial signal line, so that when the pixel drive circuit drives the OLED to emit light, the initial signal line may reset an anode voltage of the OLED to ensure normal display of a next frame. In order to ensure the normal display, the OLED does not emit light when the initial signal line may reset the anode voltage of the OLED.

Generally, since a signal of the initial signal line is a constant signal, and a signal of the low-level power supply line will change dynamically, when the initial signal line resets the anode voltage of the OLED, the anode voltage and a cathode voltage of the OLED cannot be ensured to be consistent. At this time, the OLED will emit light due to flow of a current, which will lead to abnormal display of the LED display and reduce the display effect of the OLED display.

Figure 2:
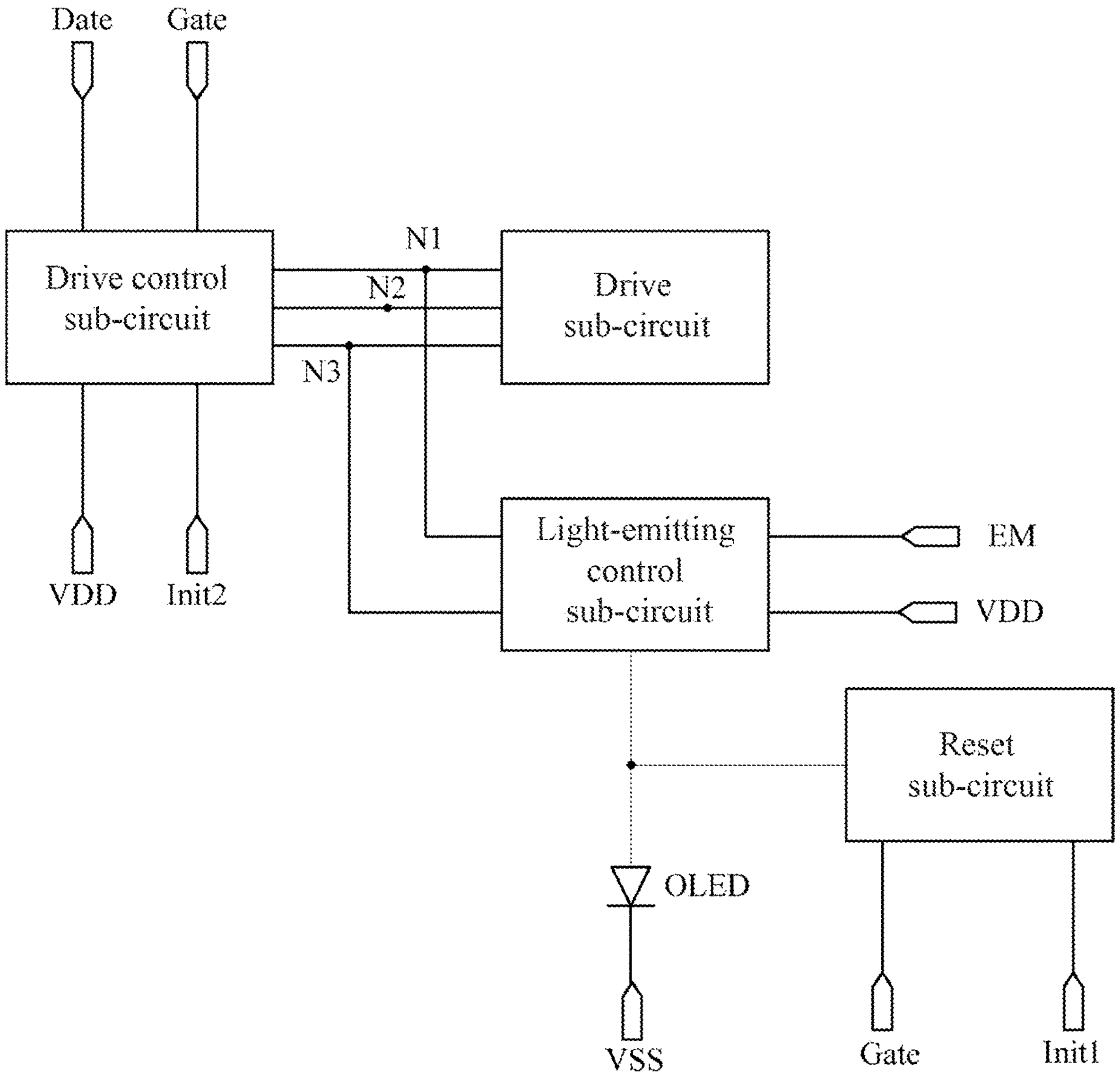
FIG. 2 is a schematic diagram of a structure of a pixel drive circuit according to an embodiment of the present disclosure.

FIG. 1 is a schematic diagram of a structure of a display substrate according to an embodiment of the present disclosure, and FIG. 2 is a schematic diagram of a structure of a pixel drive circuit according to an embodiment of the present disclosure. As shown in FIG. 1 and FIG. 2, a display substrate according to an embodiment of the present disclosure includes a display region AA and a non-display region AA'. The display substrate includes a substrate (not shown in the figure), a first power supply line VSS, a scanning signal line Gate, a first initial signal line Init1 and multiple display units 10 disposed on the substrate. The display units 10 are located in the display region AA, and the first power supply line VSS is located in the non-display region AA'.

A display unit includes a drive structure layer and a light-emitting structure layer. The light-emitting structure layer includes a light-emitting element 12, and the drive structure layer includes a pixel drive circuit 11 configured to drive the light-emitting element 12 to emit light. The pixel drive circuit includes: a reset sub-circuit which is connected with the scanning signal line, the first initial signal line Init1 and a first electrode of the light-emitting element respectively, and is configured to provide a signal of the first initial signal line Init1 to the first electrode of the light-emitting element under the control of a signal of the scanning signal line Gate to initialize the first electrode of the light-emitting element. A second electrode of the light-emitting element is connected with the first power supply line VSS. The first initial signal line Init1 is electrically connected with the first power supply line VSS.

In an exemplary embodiment, the substrate may be a rigid substrate or a flexible substrate. The rigid substrate may be, but is not limited to, one or more of glass and metal foils. The flexible substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers.

In an exemplary embodiment, the non-display region AA' surrounds the display region AA.

In an exemplary embodiment, the light-emitting element 12 may be an OLED.

In an exemplary embodiment, the number of scanning signal lines Gate may be multiple, and the multiple scanning signal lines Gate are disposed in parallel and extend along a first direction. The scanning signal line located in the display region is connected with the pixel drive circuit.

In an exemplary embodiment, the first power supply line VSS and the first initial signal line Init1 may be disposed in different layers. The first power supply line VSS and the scanning signal line Gate may be disposed in different layers.

In an exemplary embodiment, a signal of the first power supply line VSS may be a low-level signal.

In an exemplary embodiment, the scanning signal line Gate and the first power supply line VSS may be made of metal, such as any one or more of silver (Ag), copper (Cu), aluminum (Al), and molybdenum (Mo), or alloy materials of the above metals, such as Aluminum neodymium (AlNd) alloy or Molybdenum Niobium (MoNb) alloy.

In an exemplary embodiment, the scanning signal line Gate, the first power supply line VSS and the first initial signal line Init1 may be a single-layer structure or a multi-layer composite structure such as Mo/Cu/Mo.

In an exemplary embodiment, the light-emitting structure layer in the display units may include a first electrode, a pixel defining layer, an organic light-emitting layer, and a second electrode. The first electrode is connected with the drive structure layer.

In an exemplary embodiment, a manufacturing material of the first electrode may be indium tin oxide ITO or zinc tin oxide IZO. The pixel defining layer may be made of polyimide, acrylic or polyethylene terephthalate. The second electrode may be made of any one or more of magnesium (Mg), silver (Ag), aluminum (Al), copper (Cu) and lithium (Li), or an alloy made of any one or more of the above metals.

The display substrate according to an embodiment of the present disclosure includes: a display region and a non-display region. The display substrate includes a substrate and a first power supply line, a scanning signal line, a first initial signal line and multiple display units disposed on the substrate. The display units are located in the display region, and the first power supply line is located in the non-display region. The display unit includes: a drive structure layer and a light-emitting structure layer. The light-emitting structure layer includes: a light-emitting element, and the drive structure layer includes: a pixel drive circuit configured to drive the light-emitting element to emit light. The pixel drive circuit includes: a reset sub-circuit, connected with the scanning signal line, the first initial signal line and a first electrode of the light-emitting element respectively, and configured to provide a signal of the first initial signal line to the first electrode of the light-emitting element under the control of a signal of the scanning signal line to initialize the first electrode of the light-emitting element. A second electrode of the light-emitting element is connected with the first power supply line. The first initial signal line is electrically connected with the first power supply line. According to the present disclosure, the first initial signal line is electrically connected with the first power supply line, which can ensure that the signals of the first electrode and the second electrode of the light-emitting element are equal when the pixel drive circuit initializes the first electrode of the light-emitting element, so that the light-emitting element does not emit light in this period, to ensure the normal display of the display substrate, and improve the display effect of the display substrate.

In an exemplary embodiment, as shown in FIG. 1, the first initial signal line Init1 includes: a first initial signal part Init11 and a second initial signal part Init12 which are connected with each other. The first initial signal part Init11 extends along the first direction and is connected with the reset sub-circuit in the pixel drive circuit. The second initial signal part Init12 extends along the second direction and is connected with the first power supply line VSS. The first direction is an extension direction of the scanning signal line, and the second direction is perpendicular to the first direction.

In an exemplary embodiment, the second initial signal part Init12 may be located in the non-display region AA', and disposed at a side of the first power supply line close to the display region AA.

In an exemplary embodiment, as shown in FIG. 1, the display substrate may further include: a gate driver 20 located in the non-display region AA'. The Gate driver 20 is connected with the scanning signal line Gate. The gate driver 20 is disposed between the second initial signal part Init12 and the first power supply line VSS.

In an exemplary embodiment, as shown in FIG. 1, the first power supply line VSS may include a first power supply signal part VSS1, a second power supply signal part VSS2 and a third power supply signal part VSS3.

The first power supply signal part VSS1 and the third power supply signal part VSS3 extend along the second direction, and the second power supply signal part VSS2 extends along the first direction. The first power supply signal part VSS1 is connected with one end of the second power supply signal part VSS2, and the third power supply signal part VSS3 is connected with the other end of the second power supply signal part VSS2. The second initial signal part Init12 is connected with a middle part of the second power supply signal part VSS2.

In an exemplary implementation, the display substrate may include: a timing controller 30 and a clock signal line 40 located in the non-display region AA'. The clock signal line 40 is connected with the timing controller 30 and the gate driver 20 respectively, configured to provide a clock signal to the gate driver 20 under the control of the timing controller 30.

An orthogonal projection of the second initial signal part Init12 on the substrate and an orthogonal projection of the clock signal line 40 on the substrate have an overlapping region.

In an exemplary embodiment, the number of clock signal lines 40 may be multiple, depending on the clock signal required in the gate driver 20.

In an exemplary embodiment, the timing controller 30 may be connected with the first power supply line through traces and configured to provide signals to the first power supply line.

In an exemplary embodiment, the first initial signal line is electrically connected with the first power supply line, and the display substrate only needs to provide a signal to the first power supply line, which may reduce traces for providing signals to the first initial signal line and routings of the display substrate.

Figure 3:
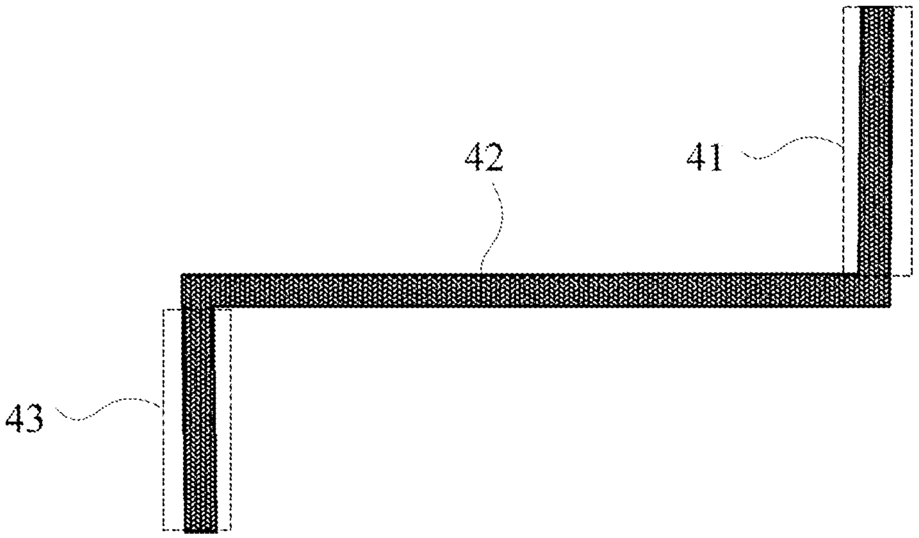
FIG. 3 is a schematic diagram of a structure of a clock signal line according to an exemplary embodiment.

FIG. 3 is a schematic diagram of a structure of a clock signal line according to an exemplary embodiment. As shown in FIG. 3, the clock signal line according to the exemplary embodiment includes a first clock signal part 41, a second clock signal part 42 and a third clock signal part 43.

The first clock signal part 41 and the third clock signal part 43 extend along a second direction. The second clock signal part 42 extends along a first direction. A first end of the first clock signal part 41 is connected with a gate driver, and a second end of the first clock signal part 41 is connected with a first end of the second clock signal part 42. A second end of the second clock signal part 42 is connected with a first end of the third clock signal part 43. A second end of the third clock signal part 43 is connected with a timing controller. An orthogonal projection of the second initial signal part Init12 on a substrate and an orthogonal projection of the second clock signal part 42 on the substrate have an overlapping region.

In an exemplary embodiment, a scanning signal line Gate may include: a first scanning signal line Gate1 and a second scanning signal line Gate2 disposed in parallel. A second scanning signal line Gate2 and a first scanning signal line Gate1 of a pixel drive circuit of a next row are the same signal line, thus reducing the number of the signal lines of a display substrate and achieving a narrow frame of the display substrate.

In an exemplary embodiment, as shown in FIG. 1, the display substrate may further include a second power supply line VDD, a light-emitting signal line EM, a Data signal line Data and a second initial signal line (not shown in the figure). The light-emitting signal line EM extends along the first direction, and the second power supply line VDD and the data signal line Data extend along the second direction.

In an exemplary embodiment, the second power supply line VDD may continuously provide a high-level signal.

In an exemplary embodiment, multiple display units are arranged in a matrix, and the multiple display units are defined by crossing of data signal lines and scanning signal lines. The first scanning signal line and the second scanning signal line define a display row, and the adjacent data lines define a display column.

In an exemplary embodiment, the display substrate may further include: a source driver. The data signal line is connected with the source driver.

Figure 4:
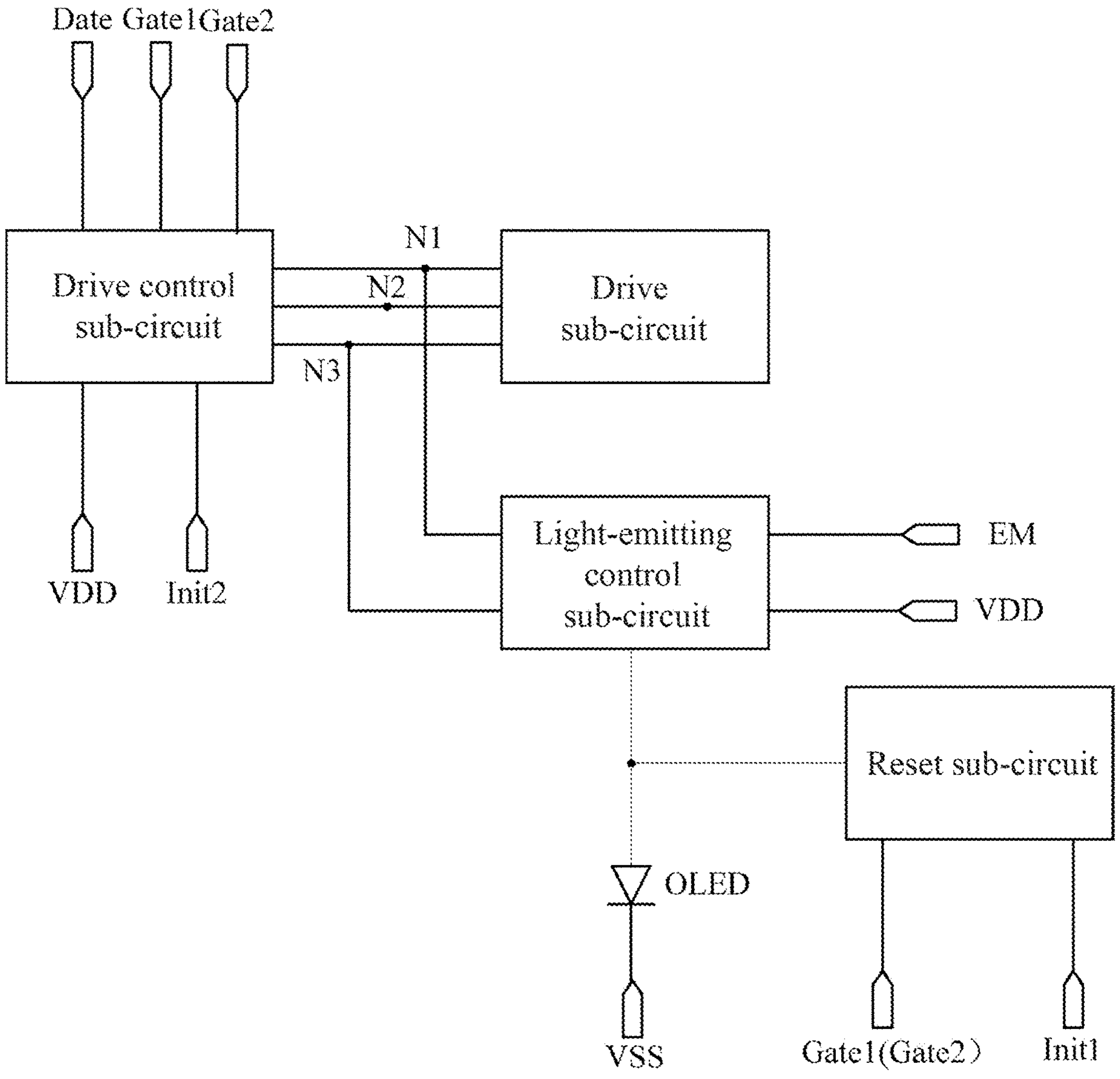
FIG. 4 is a schematic diagram of a structure of a pixel drive circuit according to an exemplary embodiment.

FIG. 4 is a schematic diagram of a structure of a pixel drive circuit according to an exemplary embodiment. As shown in FIG. 4, the pixel drive circuit according to an exemplary embodiment further includes: a drive control sub-circuit, a drive sub-circuit and a light-emitting control sub-circuit.

The drive control sub-circuit is connected with a first scanning signal line Gate1, a second scanning signal line Gate2, a data signal line Data, a second power supply line VDD, a second initial signal line Init2, a first node N1, a second node N2 and a third node N3 respectively, configured to provide a signal of the data signal line Data and a signal of the second node N2 to the first node N1 and the third node N3 respectively under the control of a signal of the first scanning signal line Gate1, and to provide a signal of the second initial signal line Init2 to the second node N2 under the control of a signal of the second scanning signal line Gate2. The drive sub-circuit is connected with the first node N1, the second node N2 and the third node N3 respectively, and configured to provide a drive current to the third node N3 under the control of signals from the first node N1 and the second node N2. The light-emitting control sub-circuit is connected with the first node N1, the third node N3, a light-emitting signal line EM, a second power supply line VDD and a first electrode of a light-emitting element respectively, and configured to provide a signal of the second power supply line VDD to the first node N1 and a signal of the third node N3 to the first electrode of the light-emitting element under the control of a signal of the light-emitting signal line EM. A reset sub-circuit is connected with the first scanning signal line Gate1 or the second scanning signal line Gate2.

Figure 5:
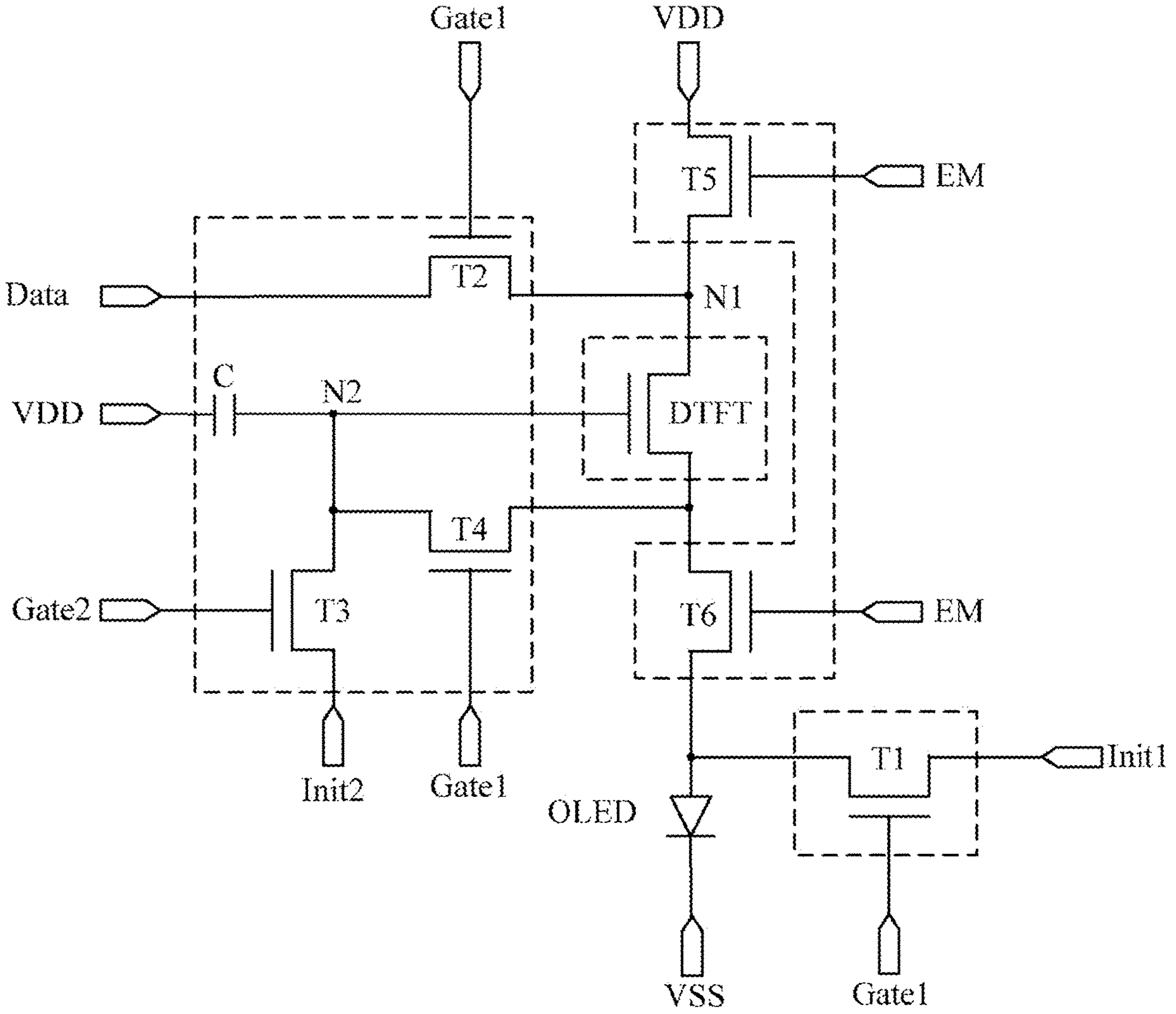
FIG. 5 is an equivalent circuit diagram of a pixel drive circuit according to an exemplary embodiment.
Figure 6:
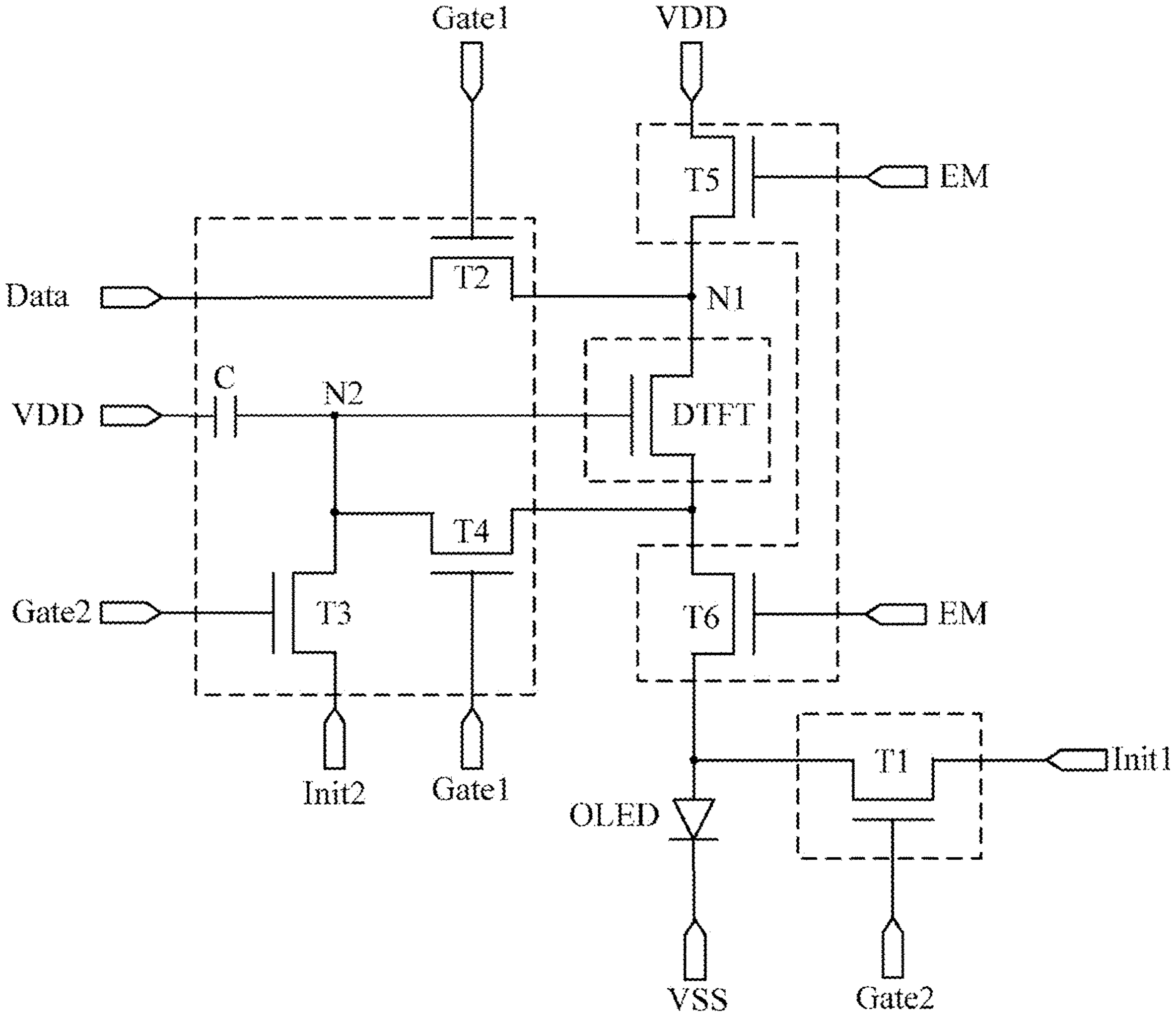
FIG. 6 is an equivalent circuit diagram of a pixel drive circuit according to another exemplary embodiment.

FIG. 5 is an equivalent circuit diagram of a pixel drive circuit according to an exemplary embodiment, and FIG. 6 is an equivalent circuit diagram of a pixel drive circuit according to another exemplary embodiment. As shown in FIG. 5 and FIG. 6, a reset sub-circuit includes: a first transistor T1; a drive control sub-circuit includes a storage capacitor C, the second to the fourth transistors T2 to T4; a drive sub-circuit includes a drive transistor DTFT; and a light-emitting control sub-circuit includes a fifth transistor T5 and a sixth transistor T6.

In an exemplary embodiment, as shown in FIG. 5, a control electrode of the first transistor T1 is connected with a first scanning signal line Gate1, a first electrode of the first transistor T1 is connected with a first initial signal line Init1, and a second electrode of the first transistor T1 is connected with a first electrode of a light-emitting element.

In an exemplary embodiment, as shown in FIG. 6, a control electrode of the first transistor T1 is connected with a second scanning signal line Gate2, a first electrode of the first transistor T1 is connected with a first initial signal line Init1, and a second electrode of the first transistor T1 is connected with the first electrode of the light-emitting element.

In an exemplary embodiment, as shown in FIG. 5 and FIG. 6, a control electrode of the second transistor T2 is connected with a scanning signal line Gate, a first electrode of the second transistor T2 is connected with a data signal line Data, and a second electrode of the second transistor T2 is connected with a first node N1. A control electrode of the third transistor T3 is connected with the scanning signal line Gate, a first electrode of the third transistor T3 is connected with a second initial signal line Init2, and a second electrode of the third transistor M3 is connected with a second node N2. A control electrode of the fourth transistor T4 is connected with the scanning signal line Gate, a first electrode of the fourth transistor T4 is connected with the second node N2, and a second electrode of the fourth transistor T4 is connected with a third node N3. A control electrode of the fifth transistor T5 is connected with a light-emitting signal line EM, a first electrode of the fifth transistor T5 is connected with a second power supply line VDD, and a second electrode of the fifth transistor T5 is connected with the first node N1. A control electrode of the sixth transistor T6 is connected with the light-emitting control line EM, a first electrode of the sixth transistor T6 is connected with the third node N3, and a second electrode of the sixth transistor T6 is connected with the first electrode of the light-emitting element. A first end of the storage capacitor C is connected with the second power supply line VDD, and a second end of the storage capacitor C is connected with the second node N2.

In an exemplary embodiment, the first to the sixth transistors T1 to T6 are all switch transistors. The drive transistor DTFT and the first to the sixth transistors T1 to T6 may all be N-type thin film transistors or P-type thin film transistors. Using the same type of transistors in the pixel drive circuit may unify a process flow, reduce processes of the display substrate, and improve the yield of the product.

Exemplary circuit structures of the reset sub-circuit, the drive control sub-circuit, the drive sub-circuit and the light-emitting control sub-circuit are shown in FIG. 5 and FIG. 6, and the implementation of each of the above sub-circuits is not limited to this, but may be another circuit structure.

In the following, a pixel drive circuit according to an exemplary embodiment will be explained by working processes of pixel drive circuits provided in FIG. 5 and FIG. 6 respectively.

Figure 7:
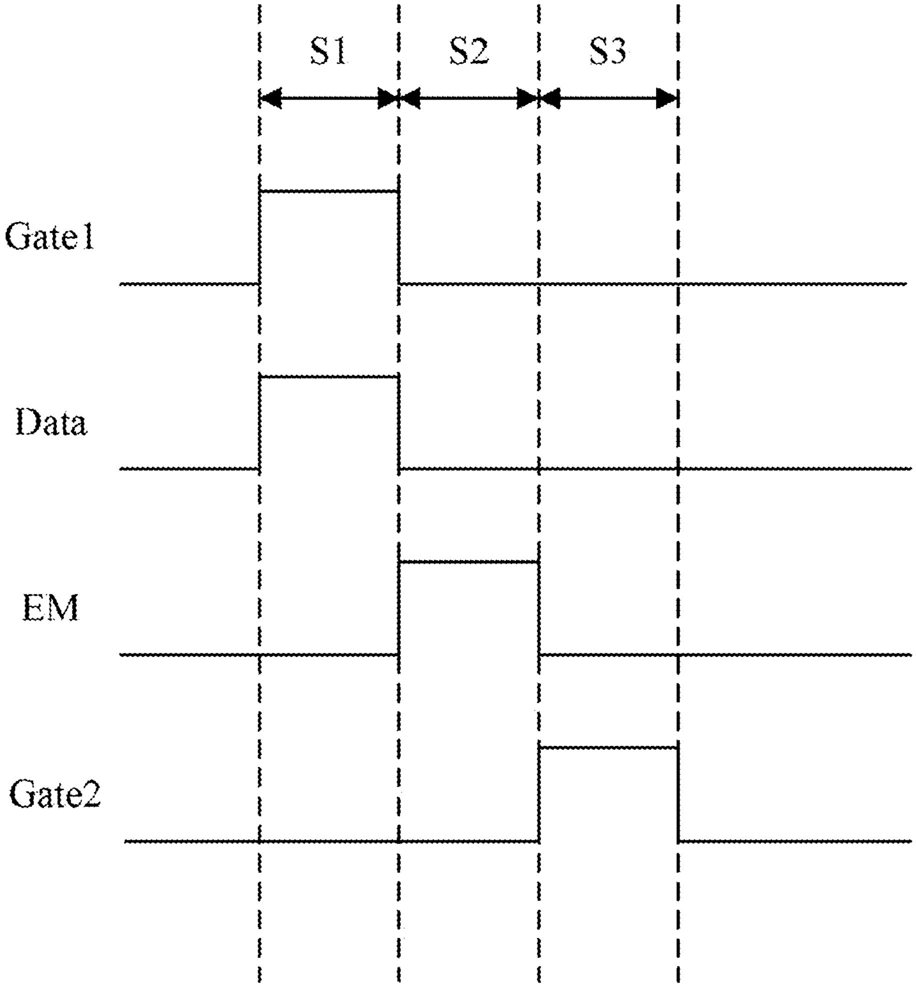
FIG. 7 is a timing diagram of working of a pixel drive circuit according to an exemplary embodiment.

For example, the transistors in the pixel drive circuit provided in FIG. 5 and FIG. 6 are all N-type thin film transistors, FIG. 7 is a timing diagram of working of a pixel drive circuit according to an exemplary embodiment. As shown in FIG. 5 to FIG. 7, the pixel drive circuit includes six switch transistors (T1 to T6), one drive transistor (DTFT), one capacitor unit (C) and eight signal lines (Data, Gate1, Gate2, Init1, Init2, VDD, VSS and EM).

A working process of the pixel drive circuit provided by FIG. 5 includes the following stages.

In a first stage S1, that is, a writing stage, the signal of the first scanning signal line Gate1 is a high-level signal, the first transistor T1 is turned on, and the signal of the first initial signal line Init1 is provided to the first electrode of the OLED. Since the first initial signal line Init1 is connected with the first power supply line VSS, a signal voltage of the first electrode of the OLED is the same as that of the second electrode of the OLED, and at this time, the OLED does not emit light. The second transistor T2 is turned on, and the signal of the data signal line Data is provided to the first node N1. The fourth transistor T4 is turned on, and the second node N2 and the third node N3 are connected with each other. The signal of the light-emitting signal line EM is a low-level signal, the fifth transistor T5 and the sixth transistor T6 are turned off, and the drive transistor DTFT cannot output the drive current.

In a second stage S2, that is, a light-emitting stage, the signals of the first scanning signal line Gate1 and the second scanning signal line Gate2 are low-level signals, the first transistor T1 to the fourth transistor T4 are turned off, and the storage capacitor C starts to discharge. Since a voltage of the signal of the second node N2 is greater than that of the signal of the first node N1, the drive transistor DTFT is turned on at this time. The signal of the light-emitting signal line EM is a high-level signal, the fifth transistor T5 and the sixth transistor T6 are turned on, and the drive transistor DTFT outputs the drive current to drive the OLED to emit light.

In a third stage S3, that is, a reset stage, the signal of the second scanning signal line Gate2 is a high-level signal, the third transistor T3 is turned on, and the signal of the second initial signal line Init2 is provided to the second node N2 to initialize the control electrode of the drive transistor DTFT. The signal of the light-emitting signal line EM is a low-level signal, and the fifth transistor T5 and the sixth transistor T6 are turned off.

A working process of the pixel drive circuit provided by FIG. 6 includes the following stages.

In a first stage S1, that is, a writing stage, the signal of the first scanning signal line Gate1 is a high-level signal, the second transistor T2 is turned on, and the signal of the data signal line Data is provided to the first node N1. The fourth transistor T4 is turned on, and the second node N2 and the third node N3 are connected with each other. The signal of the light-emitting signal line EM is a low-level signal, the fifth transistor T5 and the sixth transistor T6 are turned off, and the drive transistor DTFT cannot output the drive current.

In a second stage S2, that is, a light-emitting stage, the signals of the first scanning signal line Gate1 and the second scanning signal line Gate2 are low-level signals, the first to the fourth transistors T1 to T4 are turned off, and the storage capacitor C starts to discharge. Since a voltage of the signal of the second node N2 is greater than that of the signal of the first node N1, the drive transistor DTFT is turned on at this time. The signal of the light-emitting signal line EM is a high-level signal, the fifth transistor T5 and the sixth transistor T6 are turned on, and the drive transistor DTFT outputs the drive current to drive the OLED to emit light.

In a third stage S3, that is, a reset stage, the signal of the second scanning signal line Gate2 is a high-level signal, the first transistor T1 is turned on, and the signal of the first initial signal line Init1 is provided to the first electrode of the OLED to initialize the first electrode of the OLED. Since the first initial signal line Init1 is connected with the first power supply line VSS, a signal voltage of the first electrode of the OLED is the same as that of the second electrode of the OLED, and at this time, the OLED does not emit light. The third transistor T3 is turned on, and the signal of the second initial signal line Init2 is provided to the second node N2 to initialize the control electrode of the drive transistor DTFT. The signal of the light-emitting signal line EM is a low-level signal, and the fifth transistor T5 and the sixth transistor T6 are turned off.

In an exemplary embodiment, the drive structure layer includes: a first insulating layer, a semiconductor layer, a second insulating layer, a first metal layer, a third insulating layer, a second metal layer, a fourth insulating layer, and a third metal layer which are sequentially stacked on the substrate.

The semiconductor layer may include an active layer of all transistors in the pixel drive circuit. The first metal layer may include: a first scanning signal line, a second scanning signal line, a light-emitting signal line and the control electrodes of all transistors in the pixel drive circuit. The second metal layer may include: a first initial signal line and a second initial signal line. The third metal layer may include: the first power supply line, the second power supply line, the data signal line and the first and second electrodes of all transistors in the pixel drive circuit.

In an exemplary embodiment, the fourth insulating layer is disposed with a via hole exposing the first initial signal line; the via hole is located in the non-display region and is disposed at a side of the gate driver close to the display region; the first power supply line is connected with the first initial signal line through the via hole.

In an exemplary embodiment, the via hole exposes the second initial signal part of the first initial signal line; the first power supply line is connected with the second initial signal part of the first initial signal line through the via hole.

In an exemplary embodiment, the first metal layer, the second metal layer and the third metal layer may be made of metal materials, such as any one or more of silver (Ag), copper (Cu), aluminum (Al) and molybdenum (Mo), or alloy materials of the above metals, such as aluminum neodymium alloy (AlNd) or molybdenum niobium alloy (MoNb), and may be a single-layer structure or a multi-layer composite structure, such as Mo/Cu/Mo.

In an exemplary embodiment, the first insulating layer, referred to as a buffer layer, is configured to improve the water and oxygen resistance of the substrate. The second insulating layer is referred to as the first insulating layer. The third insulating layer is referred to as the second insulating layer. The fourth insulating layer is referred to as an interlayer insulating layer. The thickness of the second insulating layer or the third insulating layer is smaller than the thickness of the fourth insulating layer, and the thickness of the first insulating layer is smaller than a sum of the thicknesses of the second insulating layer and the thicknesses of the fourth insulating layer, which may ensure the insulating effect.

In an exemplary embodiment, the first insulating layer, the second insulating layer, the third insulating layer and the fourth insulating layer may be made of any one or more of silicon oxide (SiOx), silicon nitride (SiNx) and silicon oxynitride (SiON), and may be a single-layer, a multi-layer or a composite layer.

In an exemplary embodiment, the semiconductor layer may be a polysilicon layer or a metal oxide layer. The metal oxide layer may be made of an oxide containing indium and tin, an oxide containing tungsten and indium, an oxide containing tungsten and indium and zinc, an oxide containing titanium and indium, an oxide containing titanium and indium and tin, an oxide containing indium and zinc, an oxide containing silicon and indium and tin, or an oxide containing indium or gallium and zinc, etc.

In an exemplary embodiment, the metal oxide layer may a single-layer structure, a double-layer structure, or a multi-layer structure.

In an exemplary embodiment, the display substrate further includes: a fourth metal layer disposed at a side of the first insulating layer close to the substrate. The fourth metal layer may include: one plate of the storage capacitor, and one plate of the storage capacitor may be used as a blocking layer of the active layer of the drive transistor.

In an exemplary embodiment, the fourth metal layer may be made of metal materials, such as any one or more of argentum (Ag), copper (Cu), aluminum (Al) and molybdenum (Mo), or alloy materials of the above metals, such as Aluminum neodymium (AlNd) alloy or Molybdenum Niobium (MoNb) alloy, and may have a single-layer structure or a multi-layer composite structure, such as Mo/Cu/Mo.

In an exemplary embodiment, the other plate of the storage capacitor may be disposed in the second metal layer.

In an exemplary embodiment, the display substrate further includes a fifth insulating layer and a flat layer which are disposed at a side of the third metal layer away from the substrate. The fifth insulating layer is referred to as a passivation layer.

In an exemplary embodiment, the fifth insulating layer may be made of any one or more of silicon oxide (SiOx), silicon nitride (SiNx) and silicon oxynitride (SiON), and may be a single-layer, multi-layers or a composite layer. The flat layer may be made of organic materials.

In an exemplary embodiment, the structures in the same film layer are formed by the same process. Among them, the first scanning signal line, the second scanning signal line, the light-emitting signal line and the control electrodes of all transistors in the pixel drive circuit are formed by the same process. The first initial signal line and the second initial signal line are formed by the same process. The first power supply line, the second power supply line, the data signal line and the first and the second electrodes of all transistors in the pixel drive circuit are formed by the same process.

In an exemplary embodiment, as shown in FIG. 1, the number of first power supply lines VSS located in the non-display region is two, and the two first power supply lines are located at two sides of the display region respectively.

The number of the first initial signal lines connected with the reset sub-circuit in each pixel drive circuit is two; one of the first initial signal lines is located at a side of a first one of the first power supply lines close to the display region and connected with the first one of the first power supply lines, and the other one of the first initial signal lines is located at a side of a second one of the first power supply lines close to the display region and connected with the second one of the first power supply lines. The arrangement of the first initial signal lines may avoid the inability of initializing the transistors of the light-emitting elements after one of the initial signal lines is broken, and may improve the performance of the display substrate.

An embodiment of the present disclosure further provides a display device, including the display substrate according to any of the embodiments as described above.

In an exemplary embodiment, the display device may be a mobile phone, a tablet computer, a television, a display, a notebook computer, a digital photo frame, a navigator, or any product or component with display and touch functions.

The display substrate according to the present embodiment is the display substrate according to any of the embodiments as described above, and the display substrates are similar in the implementation principle and effect, which will not be described repeatedly here.

The drawings in the present disclosure only involve the structures included in the embodiments of the present disclosure, and other structures may refer to common designs.

For clarity, the thickness and dimension of layers or micro-structures are magnified in the accompanying drawings used for describing the embodiments of the present disclosure. It can be understood that when an element, such as a layer, a film, a region or a substrate, is referred to as being located “above” or “below” another element, the element may be “directly” located “above” or “below” another element, or an intermediate element may exist.

Although the implementations of the present disclosure are disclosed above, the contents are only implementations adopted to easily understand the present disclosure but are not intended to limit the present disclosure. Those skilled in the art may make any modifications and variations to implementation forms and details without departing from the spirit and scope disclosed by the present disclosure. However, the scope of patent protection of the present disclosure should also be subject to the scope defined by the appended claims.

The invention claimed is:

1. A display substrate, comprising: a display region and a non-display region, wherein the display substrate comprises: a substrate, and a first power supply line, a scanning signal line, a first initial signal line and a plurality of display units disposed on a substrate; the display units are located in the display region, and the first power supply line is located in the non-display region;

a display unit comprises: a drive structure layer and a light-emitting structure layer; the light-emitting structure layer comprises: a light-emitting element, and the drive structure layer comprises: a pixel drive circuit configured to drive the light-emitting element to emit light; the pixel drive circuit comprises: a reset sub-circuit, connected with the scanning signal line, the first initial signal line and a first electrode of the light-emitting element respectively, and configured to provide a signal of the first initial signal line to the first electrode of the light-emitting element under control of a signal of the scanning signal line to initialize the first electrode of the light-emitting element; and a second electrode of the light-emitting element is connected with the first power supply line; and the first initial signal line is electrically connected with the first power supply line;

wherein the scanning signal line comprises: a first scanning signal line and a second scanning signal line disposed in parallel; the display substrate also comprises: a second power supply line, a light-emitting signal line, a data signal line and a second initial signal line;

the pixel drive circuit further comprises: a drive control sub-circuit, a drive sub-circuit and a light-emitting control sub-circuit;

the reset sub-circuit comprises: a first transistor; the drive control sub-circuit comprises: a storage capacitor, second to fourth transistors; the drive sub-circuit comprises: a drive transistor; and the light-emitting control sub-circuit comprises a fifth transistor and a sixth transistor;

the drive structure layer comprises: a first insulating layer, a semiconductor layer, a second insulating layer, a first metal layer, a third insulating layer, a second metal layer, a fourth insulating layer, and a third metal layer which are sequentially stacked on the substrate; and the semiconductor layer comprises: an active layer of all transistors in the pixel drive circuit the first metal layer comprises: the first scanning signal line, the second scanning signal line, the light-emitting signal line and control electrodes of all transistors in the pixel drive circuit the second metal layer comprises: the first initial signal line and the second initial signal line; the third metal layer comprises: the first power supply line, the second power supply line, the data signal line and the first and second electrodes of all transistors in the pixel drive circuit.

2. The display substrate according to claim 1, wherein the first initial signal line comprises: a first initial signal part and a second initial signal part connected with each other;

the first initial signal part extends along a first direction and is connected with the reset sub-circuit in the pixel drive circuit; the second initial signal part extends along a second direction and is connected with the first power supply line; and the first direction is an extension direction of the scanning signal line, and the second direction is perpendicular to the first direction.

3. The display substrate according to claim 2, wherein the second initial signal part is located in the non-display region and is disposed at a side of the first power supply line close to the display region.

4. The display substrate according to claim 3, wherein the first power supply line comprises a first power supply signal part, a second power supply signal part and a third power supply signal part;

the first power supply signal part and the third power supply signal part extend along the second direction, and the second power supply signal part extends along the first direction; the first power supply signal part is connected with one end of the second power supply signal part, and the third power supply signal part is connected with the other end of the second power supply signal part; and the second initial signal part is connected with a middle part of the second power supply signal part.

5. The display substrate according to claim 2, further comprising: a gate driver located in the non-display region; wherein the gate driver is disposed between the second initial signal part and the first power supply line.

6. The display substrate according to claim 5, further comprising: a timing controller and a clock signal line located in the non-display region; wherein the clock signal line is connected with the timing controller and the gate driver respectively, and is configured to provide a clock signal to the gate driver under control of the timing controller; the timing controller is connected with the third power supply signal part; and an orthogonal projection of the second initial signal part on the substrate and an orthogonal projection of the clock signal line on the substrate have an overlapping region.

7. The display substrate according to claim 6, wherein the clock signal line comprises: a first clock signal part, a second clock signal part and a third clock signal part;

the first clock signal part and the third clock signal part extend along the second direction; the second clock signal part extends along the first direction;

a first end of the first clock signal part is connected with the gate driver, and a second end of the first clock signal part is connected with a first end of the second clock signal part; a second end of the second clock signal part is connected with a first end of the third clock signal part; a second end of the third clock signal part is connected with the timing controller; and the orthogonal projection of the second initial signal part on the substrate and an orthogonal projection of the second clock signal part on the substrate have an overlapping region.

8. The display substrate according to claim 7, wherein the light-emitting signal line extends along the first direction, and the second power supply line and the data signal line extend along the second direction.

9. The display substrate according to claim 8, wherein the drive control sub-circuit is connected with the first scanning signal line, the second scanning signal line, the data signal line, the second power supply line, the second initial signal line, a first node, a second node and a third node respectively, and is configured to provide a signal of the data signal line and a signal of the second node to the first node and the third node respectively under control of a signal of the first scanning signal line, and to provide a signal of the second initial signal line to the second node under control of a signal of the second scanning signal line;

the drive sub-circuit is connected with the first node, the second node, and the third node respectively, and is configured to provide a drive current to the third node under control of signals of the first node and the second node;

the light-emitting control sub-circuit is connected with the first node, the third node, the light-emitting signal line, the second power supply line and the first electrode of the light-emitting element respectively, and is configured to provide the signal of the second power supply line to the first node and a signal of the third node to the first electrode of the light-emitting element under control of a signal of the light-emitting signal line; and the reset sub-circuit is connected with the first scanning signal line or the second scanning signal line.

10. The display substrate according to claim 9, wherein a control electrode of the first transistor is connected with the first scanning signal line or the second scanning signal line, a first electrode of the first transistor is connected with the first initial signal line, and a second electrode of the first transistor is connected with the first electrode of the light-emitting element;

a control electrode of the second transistor is connected with the first scanning signal line, a first electrode of the second transistor is connected with the data signal line, and a second electrode of the second transistor is connected with the first node;

a control electrode of the third transistor is connected with the second scanning signal line, a first electrode of the third transistor is connected with the second initial signal line, and a second electrode of the third transistor is connected with the second node;

a control electrode of the fourth transistor is connected with the first scanning signal line, a first electrode of the fourth transistor is connected with the second node, and a second electrode of the fourth transistor is connected with the third node;

a control electrode of the fifth transistor is connected with the light-emitting signal line, a first electrode of the fifth transistor is connected with the second power supply line, and a second electrode of the fifth transistor is connected with the first node;

a control electrode of the sixth transistor is connected with the light-emitting signal line, a first electrode of the sixth transistor is connected with the third node, and a second electrode of the sixth transistor is connected with the first electrode of the light-emitting element; and a first end of the storage capacitor is connected with the second power supply line, and a second end of the storage capacitor is connected with the second node.

11. The display substrate according to claim 1, wherein a number of the first power supply lines located in the non-display region is two; two first power supply lines are located at two sides of the display region respectively;

a number of the first initial signal lines connected with the reset sub-circuit in each pixel drive circuit is two; one of the first initial signal lines is located at a side of a first one of the first power supply lines close to the display region and is connected with the first one of the first power supply lines, and the other one of the first initial signal lines is located at a side of a second one of the first power supply lines close to the display region and is connected with the second one of the first power supply lines.

12. The display substrate according to claim 5, wherein the fourth insulating layer is disposed with a via hole exposing the first initial signal line; the via hole is located in the non-display region and is disposed at a side of the gate driver close to the display region; and the first power supply line is connected with the first initial signal line through the via hole.

13. The display substrate according to claim 12, wherein the via hole exposes the second initial signal part of the first initial signal line; and the first power supply line is connected with the second initial signal part of the first initial signal line through the via hole.

14. A display device, comprising: the display substrate according to claim 1.

15. The display substrate according to claim 3, further comprising: a gate driver located in the non-display region; wherein the gate driver is disposed between the second initial signal part and the first power supply line.

16. The display substrate according to claim 4, further comprising: a gate driver located in the non-display region; wherein the gate driver is disposed between the second initial signal part and the first power supply line.

* * * * *